United States Patent [19]

Saruhashi et al.

[11] 4,238,918
[45] Dec. 16, 1980

[54] DEVICE FOR FIXING A GRASS COLLECTING BAG ONTO A ROTARY TYPE LAWN MOWING MACHINE

[75] Inventors: Kazuo Saruhashi, Kamifukuoka; Takeo Ogano, Kawagoe, both of Japan

[73] Assignee: Honda Giken Kogyo Kabushiki Kaisha, Tokyo, Japan

[21] Appl. No.: 14,863

[22] Filed: Feb. 26, 1979

[30] Foreign Application Priority Data

Mar. 7, 1978 [JP] Japan .................................. 53-29013

[51] Int. Cl.³ ............................................ A01D 55/18
[52] U.S. Cl. ...................................... 56/202; 56/320.2
[58] Field of Search ....................... 56/202, 320.2, 16.6

[56] References Cited

U.S. PATENT DOCUMENTS

| 3,423,918 | 1/1969 | Siwek | 56/202 |
| 3,872,656 | 3/1975 | Dahl | 56/202 |

FOREIGN PATENT DOCUMENTS 1429567  3/1976  United Kingdom ..................... 56/202

Primary Examiner—Jay N. Eskovitz
Attorney, Agent, or Firm—Polster, Polster and Lucchesi

[57] ABSTRACT

A device for fixing a grass collecting bag onto a rotary type lawn mowing machine which is constructed with a machine body having a grass clipping discharging port at one portion thereof, a door type lid which is provided at the grass clipping discharging port of the lawn mowing machine and which is constantly energized in its closing direction, a grass collecting case or bag to be communicatively connected to the grass clipping discharging port, interlocking means provided on both lid and grass collecting bag to be joined together, the lid being opened inward of the grass collecting bag when both are joined together, and hooking means provided on both grass collecting bag and the grass clipping discharging port in the machine body so as to maintain tight connection between the grass collecting bag and the grass clipping discharging port.

1 Claim, 4 Drawing Figures

DEVICE FOR FIXING A GRASS COLLECTING BAG ONTO A ROTARY TYPE LAWN MOWING MACHINE

BACKGROUND OF THE INVENTION

This invention relates to a rotary type lawn mowing machine, and, more particularly, it is concerned with an implement for fixing a grass collecting case or bag onto a part of such lawn mowing machine.

In general, the lawn mowing machine is provided at the rear or lateral side of its main body with an outlet port for discharging dust of grass cut by the mowing machine, and the grass collecting bag or case is joined to the discharge port when a large ground area is to be mowed, while a lid or a cover is simply fitted onto the discharge port, when a narrow ground area is to be mowed, so that grass clippings are not discharged out of the port and scattered in all directions.

However, since the conventional lawn mowing machine is of such a construction that opening and closing of the lid must be done separately from attachment and detachment of the grass collecting bag or case, the handling of this part of the machine is somewhat troublesome. Also, since the grass collecting bag is simply hooked, at its mouth frame, on projections provided around the grass clipping discharge port so as to be readily fitted on and removed from the discharge port, it sometimes occurs that the grass collecting case gets off the discharge port when the steering handle is lowered on the pivot of the rear wheels of the lawn mowing machine at the time of its turning the direction, and the bottom of the bag thereby touches the ground surface.

SUMMARY OF THE INVENTION

In view of the inherent disadvantage in the conventional lawn mowing machine as mentioned above, it is an object of the present invention to provide a fixing device for a grass collecting bag or case which is capable of firmly and readily fixing the bag to the body of the lawn mower, thereby solving the above-mentioned problem.

In order to attain the abovementioned object, the rotary type lawn mowing machine according to the present invention is so constructed that the lid at the discharge port of the grass clippings is made a door type structure which is constantly biased toward its closing direction by means of a spring or its own weight, and that the grass collecting bag is joined to the discharge port in an abutting manner. Further, interlocking members which cause the lid at the grass clipping discharging port to open inward of the grass clipping collecting bag at the time of the connection are provided on the lid and the grass clipping collecting bag. Furthermore, hook members to maintain the butt-connection between the grass collecting bag and the grass clipping discharging port are provided on the dust collecting case and the machine body.

According to the present invention, generally speaking, there is provided a fixing device for a grass collecting bag for a rotary type lawn mowing machine which comprises: a machine body having a grass clipping discharging port at one part thereof; a door type lid which is provided at the grass clipping discharging port of the lawn mowing machine and which is constantly energized in its closing direction; a grass collecting case or bag to be communicatively butt-connected to the grass clipping discharging port; interlocking means provided on both said lid and grass collecting case to be joined, the lid being opened inward of the grass collecting bag when both are joined together, and hooking means provided on both grass collecting bag and the grass clipping discharging port in the machine body so as to maintain the butt-connection between the grass collecting bag and the grass clipping discharging port.

There has thus been outlined, rather broadly, the more important feature of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent constructions so far as they do not depart from the spirit and scope of the present invention.

BRIEF DESCRIPTION OF THE ACCOMPANYING DRAWINGS

Specific embodiment of the present invention has been chosen for the purpose of illustration and description, and are shown in the accompanying drawing, forming a part of the specification, in which.

DETAILED DESCRIPTION OF PREFERRED EMBODIMENT

Figure 4:
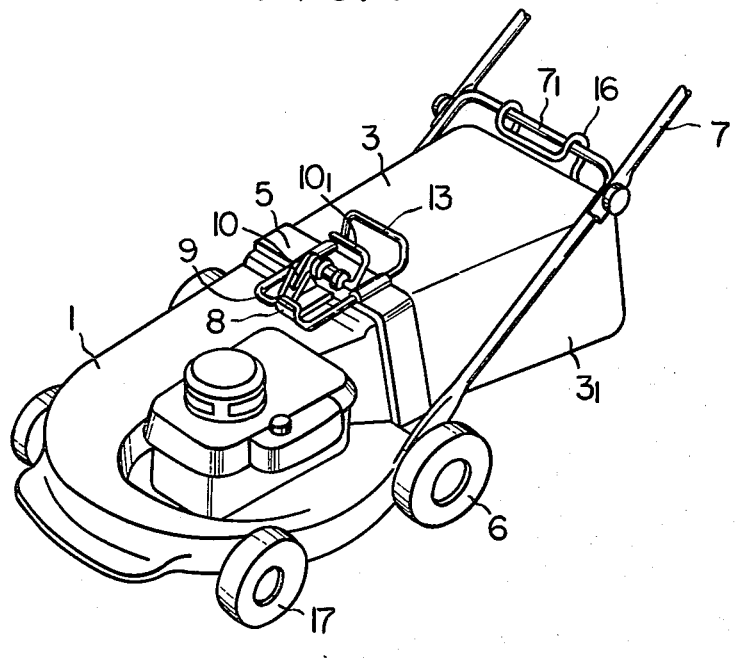
FIG. 4 is a perspective view of the lawn mowing machine, on which the grass collecting bag has been fixed by means of the device according to the present invention.

Referring to FIGS. 1 to 4 of the accompanying drawing, a rotary type lawn mower has a housing or body 1 with a clipping discharging port 2. The body is mounted on wheels 6 and 17. A grass collecting bag 3 is selectively mounted on the body 1 by means of interlocking members. The interlocking members of the preferred embodiment according to the present invention are constructed with a lever 8 which is provided integral with a lid 4 at a position upwardly extending from a pivot shaft 12 for the lid 4 which opens and closes on the pivot of the shaft 12, and a projected part 9 provided on the top surface part or portion of a mouth frame 5 of the grass collecting bag 3 and directed frontward in confrontation to the abovementioned lever 8.

The projected portion 9 is integrally formed in one part of a rod member constituting a carrying handle 13 for the grass collecting bag 3.

Hook members are constructed with a hook 10 also provided on the top surface part of the mouth frame 5 of the grass collecting bag 3 and which is constantly urged in an engaging direction, and a bracket having a hook-receiving hole in it, the bracket and the bracket's hole-defining and hook-engaging boundary being referred to hereinafter as the engagement hole 11, the bracket being mounted on the machine body 1 in the vicinity of the top surface part of the port 2 so as to receive the hook 10 therein.

The hook 10 has an operating lever $10_1$ which is so arranged that it may be gripped together with the carrying handle 13. An energizing spring 14 of the hook 10 is a twisted coil spring mounted on a center shaft 15 for oscillation of the hook 10.

Figure 1:
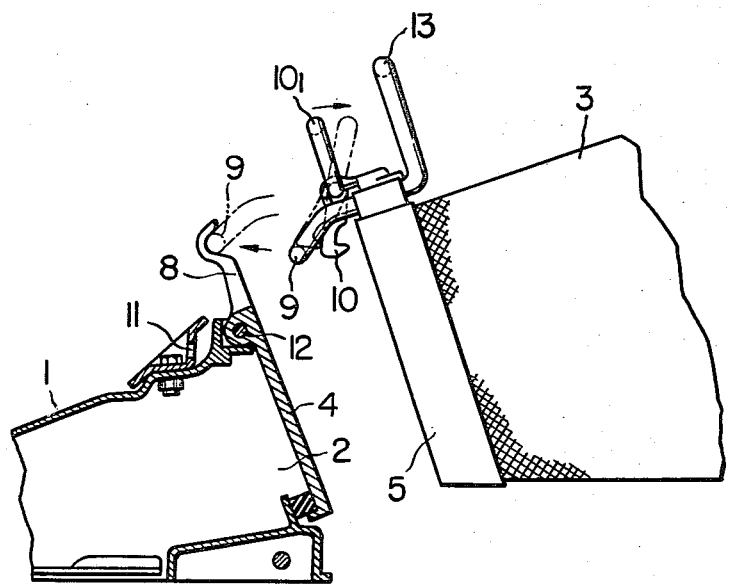
FIG. 1 is a side view of the grass collecting bag fixing device according to the present invention before the bag is fixed to the grass clipping discharging port.

FIG. 1 shows a state, in which the lid 4 is lowered to close the port 2, and it will not be pushed open by discharging air pressure.

Figure 2:
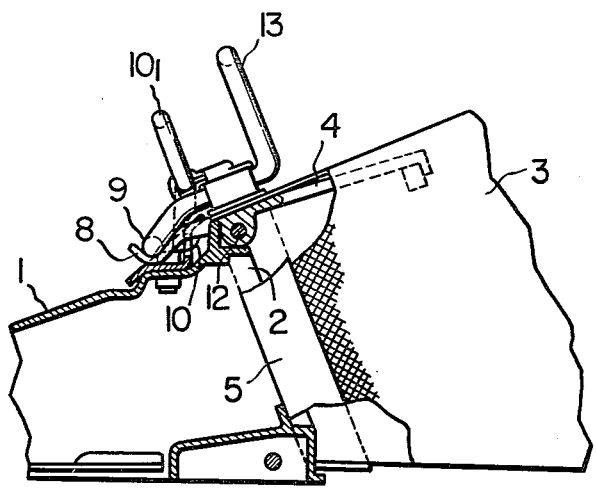
FIG. 2 is also a side view showing a state of the fixing device shown in FIG. 1 being fixed onto the machine body.
Figure 3:
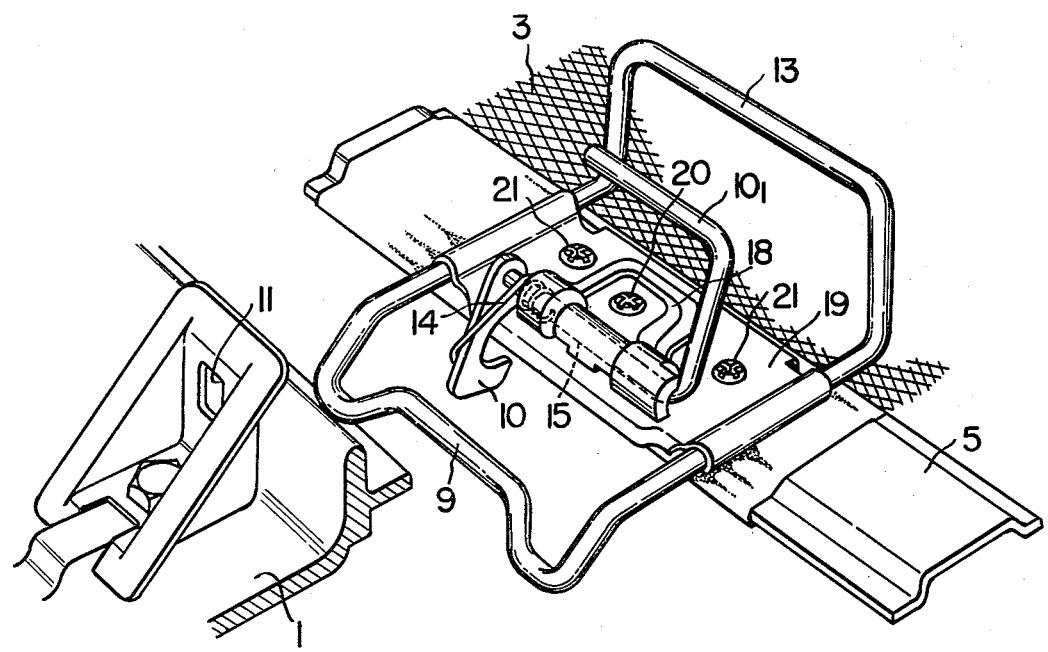
FIG. 3 is a perspective view, in an enlarged scale, of the main part of the grass collecting bag fixing device according to the present invention.

For fitting the grass collecting bag 3 to the port 2, the bag carrying handle 13 is gripped (the lever $10_1$ is also gripped at this time), to cause the open face of the grass collecting bag to approach to the front face of the lid 4 which is in a closed state as shown in FIG. 1, and then the projected portion 9 is caused to contact the lever 8 to push it backward, whereupon the lid 4 is pushed open into the grass collecting bag 3 as shown in FIG. 2.

When an operator leaves his hands off the handle 13 and the lever $10_1$ when the mouth frame 5 is matched with the grass clipping discharging port 2, the hook 10 is engaged with the hole 11 by the action of the spring 14. Accordingly, by the hooking action of the hook 10 into the engagement Hole 11, the butt-connection of the grass collecting bag 3 to the housing and surrounding the port 2 is firmly maintained. As shown in FIG. 4, the rear part of the grass collecting bag 3 is held by a hook 16 engaged with a laterally extending bar $7_1$ of a steering handle 7.

In the above-described state of the grass collecting bag being fitted to the machine body, the energizing force of the lid 4 which tends to close the port 2 acts in the direction of pushing the grass collecting case 3 backward through the lever 8 and the projected portion 9, thereby preventing the engagement between the hook 10 and the hole 11 from loosening.

For removing the grass collecting bag 3 from the grass discharging port 2, the hook 16 is taken off from the lateral bar $7_1$ and the handle 13 is gripped together with the lever $10_1$, whereby the engagement between the hook 10 and the hole 11 is released, and the grass collecting bag 3 can be dismounted from the machine body 1. Upon dismounting of the grass collecting bag 3, the lid 4 is closed automatically.

Since the fixing device for the grass collecting bag according to the present invention is of such construction as described in the foregoing, the lid 4 is automatically opened by the action of the interlocking members 8 and 9 at the time of butt-connecting the grass collecting bag 3 to the grass discharging port 2 of the lawn mowing machine, whereby there is no need of performing separately the connection of the grass collecting bag to the machine body and the opening of the lid as in the conventional lawn mowing machine.

Also, simultaneously with the abovementioned connection, the mouth frame 5 of the grass collecting bag 3 is tightly fitted around the grass discharging port 2 by the mutual engagement of the hook member 10 and engagement hole 11. Therefore, even when the front wheels 17 are raised upward with the rear wheels 6 as the pivot for turning the travelling direction of the lawn mowing machine, whereby the bottom portion $3_1$, of the grass collecting case 3 should touch the ground surface, there takes place no situation such that the grass collecting bag 3 unexpectedly gets off and is separated from around the grass clipping discharging port 2. Therefore, the fixing device for the grass collecting bag according to the present invention in the rotary type lawn mowing machine is very effective to attain the intended purpose.

The hook 10 with the lever $10_1$ as shown in the preferred embodiment of the present invention is fixedly secured to a fitting plate 19 for the handle 13 with a threaded screw 20 through a bearing plate 18, hence it can be mounted and dismounted together with the handle 13 at the time of replacing the net cloth in the grass collecting bag 3. Incidentally, a reference numeral 21 designates threaded screws to fix the fitting plate 19 to the mouth frame 5.

What is claimed is:

1. A device for tightly fastening a grass collecting bag on a rotary type lawn mowing machine, comprising:
   (a) a machine body having a grass clipping discharge port at one end thereof;
   (b) a lid provided at said grass clipping discharge port of said lawn mowing machine in a pivotally oscillatable manner and being constantly biased toward its closing direction to close said grass clipping discharge port;
   (c) a cut grass collecting bag to be butt-connected to said grass clipping discharge port in a communicative manner;
   (d) locking means to tightly fasten said grass collecting bag with said machine body at said grass clipping discharge port, said locking means being provided on the top part of both said lid and grass collecting bag, and comprising a lever integrally formed with, and extending upward from, said swingable lid at the top surface part of said grass clipping discharge port, and a projected portion being an integral part of a carrying handle for said grass collecting bag and to be engaged with said lever, said carrying handle and said projected portion integral therewith being in a substantially rectangular form, and said lid swinging upwardly inward of said grass collecting bag when said locking means are engaged to communicate said said grass clipping discharge port and said glass collecting bag; and
   (e) hook means comprising a hook bracket having a hook receiving hole therein, the bracket and hole defining boundary thereof constituting an engagement hole, fixedly secured on one top surface part of the mouth frame of the grass collecting bag and which is constantly biased toward the engaging direction with said engagement hole, an operating lever to directly oscillate said hook around a shaft when joining said grass collecting bag to said machine body, said hook means being positioned in the rectangular region defined by said carrying handle and projected portion so as to enable said operating lever for the hook to be readily gripped together with said handle when the grass collecting bag is fastened with, or removed from, said grass clipping discharge port, and a hanger to hang and hold the rear end part of said grass collecting bag to avoid unexpected removal thereof from said machine body.

* * * * *

UNITED STATES PATENT AND TRADEMARK OFFICE
CERTIFICATE OF CORRECTION

PATENT NO. : 4,238,918
DATED : December 16, 1980
INVENTOR(S) : Kazuo Saruhashi et al It is certified that error appears in the above-identified patent and that said Letters Patent are hereby corrected as shown below:

Column 4, line 45, after "communicate" cancel "said" and insert ---with---.

Signed and Sealed this

Tenth Day of March 1981

[SEAL]

Attest:

RENE D. TEGTMEYER

Attesting Officer    Acting Commissioner of Patents and Trademarks